UNITED STATES PATENT OFFICE 2,296,153

CHROMABLE DYESTUFFS OF THE TRIARYL-METHANE SERIES AND PROCESS OF PREPARING THEM

Wilhelm Eckert and Karl Schilling, Frankfort-on-the-Main, Germany, assignors to General Aniline & Film Corporation, New York, N. Y., a corporation of Delaware No Drawing. Application February 20, 1940, Serial No. 319,910. In Germany March 15, 1939

13 Claims. (Cl. 260—336)

The present invention relates to chromable dyestuffs of the thriarylmethane series and to a process of preparing them.

In U. S. Patent 2,153,059 and in patent application Serial No. 259,286, filed March 1, 1939, there are described new dyestuffs of the triarylmethane series capable of being chromed and a process of preparing these dyestuffs by condensing one molecular proportion of the anhydride of 5-hydroxybenzene-1.2.4.-tricarboxylic acid or of 3-hydroxybenzene-1.2.4.-tricarboxylic acid (5- or 3-hydroxytrimelitic acid) or the equivalent amount of the free acid with two molecular proportions of an N-substituted m-aminophenol. The same or similar dyestuffs are obtainable by condensing one molecular proportion of an N-substituted m-aminophenol with a benzene-benzoic acid compound which is obtainable by condensation of one molecular proportion of 5-hydroxybenzene-1.2.4-tricarboxylic acid or its anhydride or of 3-hydroxybenzene-1.2.4-tricarboxylic acid or its anhydride with only one molecular proportion of the N-substituted m-aminophenol.

We have found that the same or similar dyestuffs can successfully be produced by a process which comprises causing 3.6-dihalogen-4'-hydroxy-5'-carboxy-fluoran or the isomeric 3.6-dihalogen-5'-hydroxy-4'-carboxy-fluoran of the formulae:

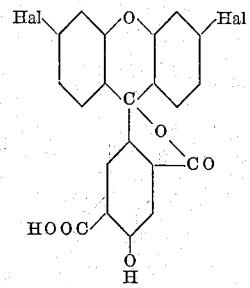

or

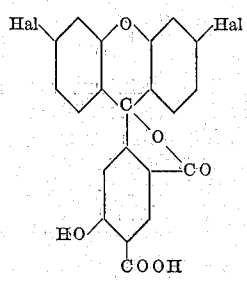

or a mixture of these isomeric compounds, or the corresponding compounds which derive from 3-hydroxy-benzene-1.2.4-tricarboxylic acid and which have the formulae:

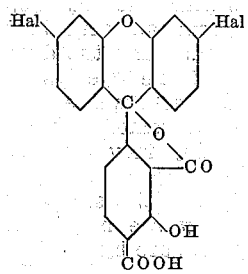

or

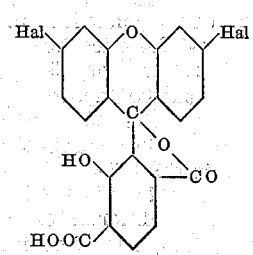

or a mixture of these isomeric compounds, to react with ammonia or with an aliphatic, aromatic, hydroaromatic or heterocyclic amino compound. The reaction is preferably carried out by melting the reagents at a temperature of between about 150° C. and about 250° C., favorably in the presence of zinc chloride. The compounds thus obtained by replacing the halogen atoms by the amino radical may be sulfonated in order to increase their water solubility, if necessary.

Suitable amino compounds are mono- and dialkylamines and hydroxyalkylamines: H₂N-alkyl, HN(alkyl)₂, for instance mono- and di-methyl-, mono- and di-ethyl-, mono- and di-propyl-, mono- and di-butyl-amines, amino alkyl sulfonic acids and alkyl amino alkyl sulfonic acids:

H₂N-alkyl sulfonic acid,

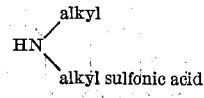

HN-(alkyl sulfonic acid)₂, for instance taurine and alkyl taurines, amino-fatty acids, arylamines and arylamino -sulfonic and -carboxylic acids:

H₂N-aryl, H₂N-aryl-SO₃H, H₂N-aryl-COOH, for instance aminobenzene, aminonaphthalene and substitution products thereof, hydroaromatic and heterocyclic amino compounds, for instance α- and β-aminotetrahydronaphthalene, aminopyridine, amino-diphenylenoxide etc.

The said amino compounds may be substituted by radicals which are capable of being chromed. Thus, for instance, the various amino-salicylic acids may be used.

The replacement of the halogen atoms by simple amino groups may be performed by treating the said dihalogen fluosan compounds with ammonia or with a compound capable of splitting off ammonia or with an aryl sulfamide and subsequent saponification.

The new process is particularly advantageous as, in some cases, the dyestuffs are obtained with still better yields. Due to the extraordinarily wide variability as to the amino-compounds to be substituted for the halogen atoms, it is possible to produce many dyestuffs which otherwise could not or only difficultly be obtained in view of the fact that a great number of the correspondingly substituted m-aminophenols are only difficultly accessible.

The dyestuffs thus obtained dye, for instance, animal fibers from an acid bath very clear shades; by afterchroming the dyeings the fastness properties of the dyeings are essentially enhanced. The dyestuffs are also suitable for the production of chromed prints on cotton and artificial silk. They may also be chromed in substance.

The following examples serve to illustrate the invention, but they are not intended to limit it thereto; the parts are by weight:

1. 86 parts of the compound which is obtainable by condensing one molecular proportion of 5-hydroxy-benzene-1.2.4-tricarboxylic acid with two molecular proportions of 1.3-dihydroxy-benzene and replacing the two hydroxy-groups in the 3- and 6-positions of the 3.6-dihydroxy-carbonhydroxy-fluoran thus obtained by chlorine atoms, which compound is the 3.6-dichloro-4'-hydroxy-5'-carboxy-fluoran or of the isomeric 3.6-dichloro-5'-hydroxy-4'-carboxy-fluoran or a mixture of these compounds, 207 parts of sodium 1-methyl-amino-ethane-2-sulfonate (sodium methyl taurine) of 62.9 per cent strength and 100 parts of anhydrous zinc chloride are melted together for 2 hours at 190° C. to 200° C. When cold, the finely pulverized melt is stirred with about 100 parts of hydrochloric acid of 10 per cent strength, filtered with suction, washed with hydrochloric acid of 10 per cent strength and dried.

The dyestuff thus obtained is a red powder which dyes wool from an acid bath bright, bluish-red tints. By after-chroming these dyeings attain very good fastness properties. The dyestuff is also excellently suitable for the production of chromed printings on cotton and artificial silk. The dyestuff has the following constitution:

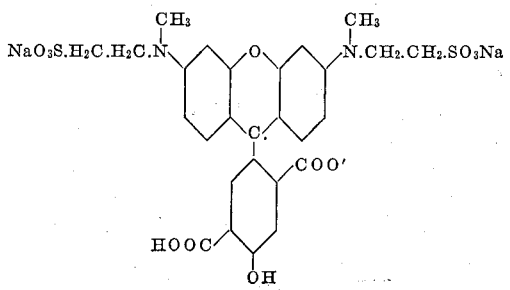

or that of the isomeric compound:

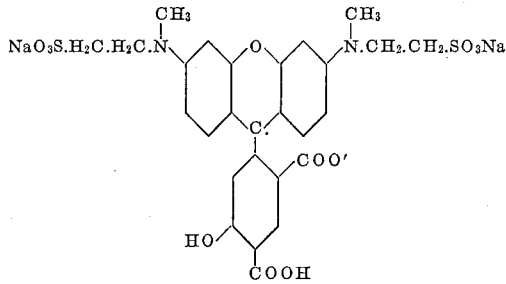

or it is a mixture of these two isomeric compounds.

2. 86 parts of 3.6-dichloro-4'-hydroxy-5'-carboxy-fluoran or of the isomeric 3.6-di-chloro-5'-hydroxy-4'-carboxy-fluoran or of a mixture of these compounds are heated with 49 parts of 2.3-dimethyl-1-aminobenzene and 60 parts of anhydrous zinc chloride for 2½ hours to 200° C. to 210° C. After cooling, the melt is finely pulverized and the powder obtained is boiled with about 100 parts of hydrochloric acid of 20 per cent strength for removing the zinc chloride. The residue is filtered with suction, washed and treated with dilute sodium carbonate solution; the red solution formed is separated from the undissolved residue by filtration and the dyestuff obtained is precipitated from the filtrate by acidification. After drying, the dyestuff is a violet-red powder which is insoluble in water and is transformed by sulfonating it according to known methods into a watersoluble sulfonic acid which dyes wool from an acid bath bluish-red tints. The fastness properties of these dyeings are considerably improved by after-chroming. The constitution of the dyestuff is illustrated by the following formulae:

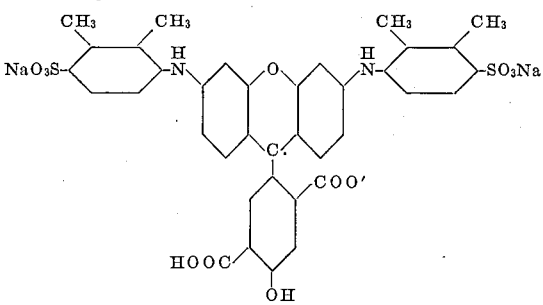

or

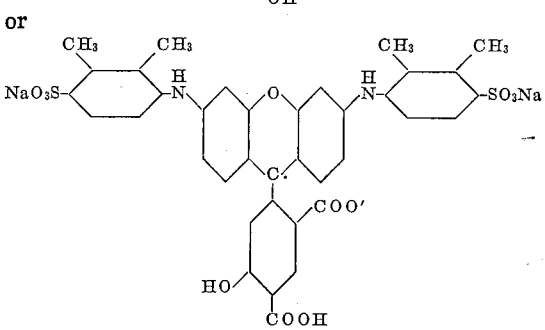

or the dyestuff is a mixture of these isomeric compounds. It is also possible to prepare this dyestuff containing sulfo groups by condensing the dichloro-hydroxy-carboxy-fluoran with 2.3-dimethyl-1-amino-benzene-4-sulfonic acid.

3. 86 parts of 3.6-dichloro-4'-hydroxy-5'-carboxy-fluoran or the isomeric 3.6-dichloro-5'-hydroxy-4'-carboxy-fluoran or of a mixture of these compounds, 40 parts of aniline and 60 parts of anhydrous zinc chloride are heated for 1½ hours to 200° C. to 210° C. After cooling the finely ground melt is boiled with hydrochloric acid of 20 per cent strength for a prolonged time (about 1 hour). The residue is filtered with suction, washed with water and treated with hot dilute sodium carbonate solution. The dyestuff solution is separated from the undissolved residue by filtration and the dyestuff is precipitated by acidifying it. It is insoluble in water and is transformed into a sulfonic acid by sulfonating it according to known methods. In this form it dyes wool from an acid bath reddish-violet tints. By after-chroming the shade is only slightly changed, but the fastness to wetting is essentially improved.

The dyestuff probably has the following composition:

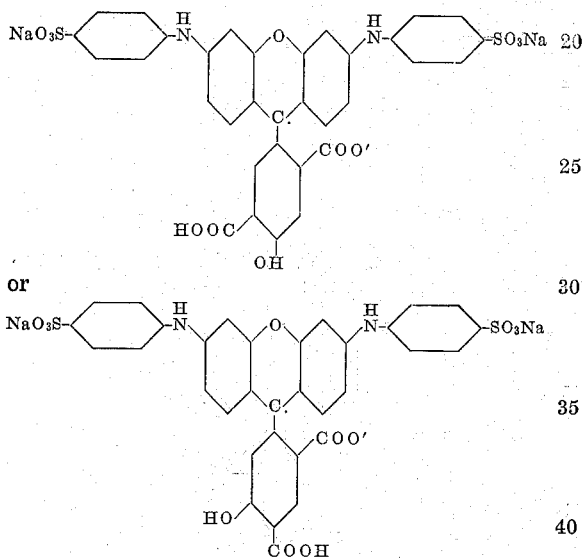

or it is a mixture of these isomeric compounds.

Instead of subsequently introducing the sulfo group it is also possible to use the 1-amino-benzene-4-sulfonic acid as reaction component.

4. 86 parts of 3.6-dichloro-4'-hydroxy-5'-carboxy-fluoran or of the isomeric 3.6-dichloro-5'-hydroxy-4'-carboxy-fluoran or of a mixture of these compounds, 55 parts of 1-amino-4-methoxy-benzene and 60 parts of anhydrous zinc chloride are heated for 2 hours to 220° C. to 225° C. The melt is further treated as described in Example 3. After the sodium carbonate solution has been precipitated with dilute mineral acids and the precipitate has been dried the dyestuff is obtained in the form of a violet, water-insoluble powder which is transformed into water-soluble sulfonic acids by sulfonation. In this form it dyes wool bluish-violet tints. The shade becomes somewhat more red by after-chroming. The fastness to wetting is considerably enhanced. The constitution of the dyestuff is shown by the following formulae:

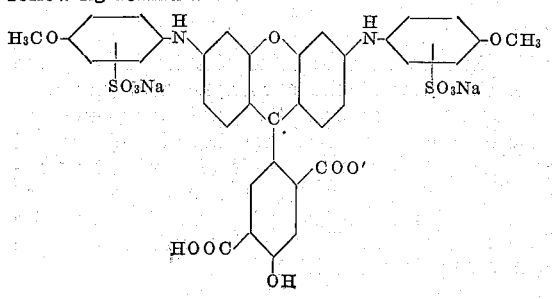

or

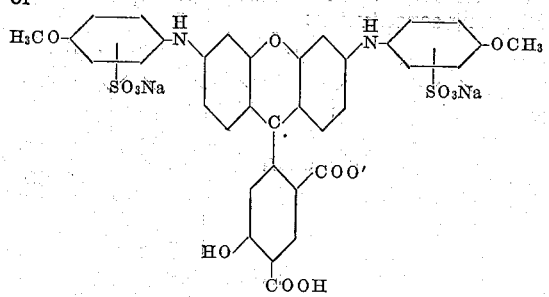

or it is a mixture of these isomeric compounds.

5. 43 parts of 3.6-dichloro-4'-hydroxy-5'-carboxy-fluoran or of the isomeric 3.6-dichloro-5'-hydroxy-4'-carboxy-fluoran or of a mixture of these compounds, 60 parts of 8-amino-quinoline, 20 parts of anhydrous zinc chloride are melted together, while stirring, for 2 hours at 240° C. After cooling, the melt is finely ground and boiled with about 500 parts of hydrochloric acid of 3 per cent strength. The residue is filtered with suction, washed with water until neutral and dried. The product is a blue powder which in known manner may be transformed into a water-soluble dyestuff by sulfonation with fuming sulfuric acid of 20 per cent strength. The dyestuff probably has the following constitution:

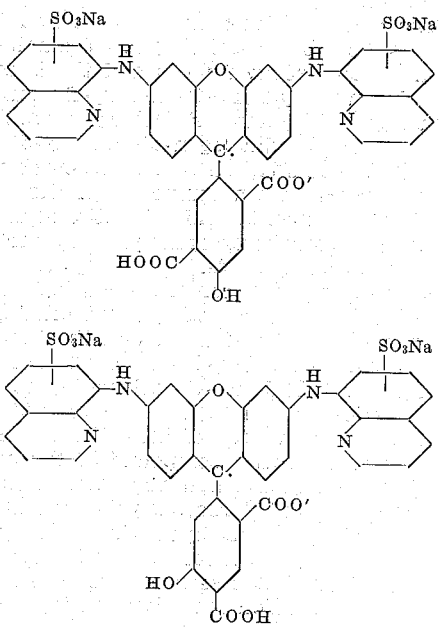

or it is a mixture of these isomeric compounds. It dyes wool from an acid bath blue tints which become very fast by afterchroming.

6. 43 parts of 3.6-dichloro-4'-hydroxy-5'-carboxy-fluoran or of the isomeric 3.6-dichloro-5'-hydroxy-4'-carboxy-fluoran or of a mixture of these compounds, 90 parts of 2-amino-3-methoxy-diphenyleneoxide, 20 parts of anhydrous zinc chloride are melted, while stirring, for 2 hours at 220° C. to 230° C. The pulverized melt is boiled with about 500 parts of dilute hydrochloric acid. The residue is filtered with suction, washed and dried. A blue powder is obtained which is insoluble in water and in dilute acids. By sulfonating the compound with sulfuric acid mono hydrate at room temperature it is converted into a water-soluble dyestuff which dyes wool from an acid bath blue tints which become very fast by after-chroming. The dyestuff probably has the following constitution:

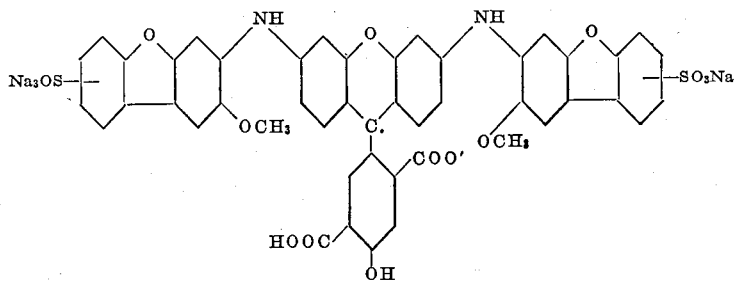

or

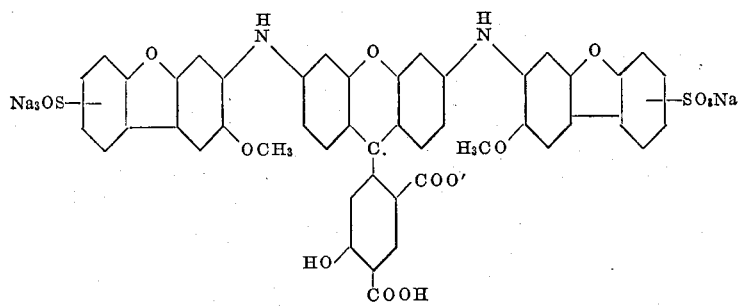

or it is a mixture of these isomeric compounds.

We claim:

1. The process which comprises causing a compound of the group consisting of 3.6-dihalogen-4'-hydroxy-5'-carboxy fluoran and the isomeric 3.6-dihalogen-5'-hydroxy-4'-carboxy-fluoran and 3.6-dihalogen-3'-hydroxy-4'-carboxy-fluoran and the isomeric 3.6-dihalogen-6'-hydroxy-5'-carboxy-fluoran and mixtures of these isomeric compounds to react with a compound of the group consisting of ammonia and aliphatic, aromatic, hydroaromatic and heterocyclic primary and secondary amino compounds.

2. The process which comprises causing a compound of the group consisting of 3.6-dihalogen-4'-hydroxy-5'-carboxy-fluoran and the isomeric 3.6-dihalogen-5'-hydroxy-4'-carboxyfluoran and 3.6-dihalogen-3'-hydroxy-4'-carboxyfluoran and the isomeric 3.6-dihalogen-6'-hydroxy-5'-carboxyfluoran and mixtures of these isomeric compounds to react with a compound of the group consisting of ammonia and aliphatic, aromatic, hydroaromatic and heterocyclic primary and secondary amino compounds by melting the reagents at a temperature of between about 150° C. and about 250° C. in the presence of zinc chloride.

3. The process which comprises causing a compound of the formula:

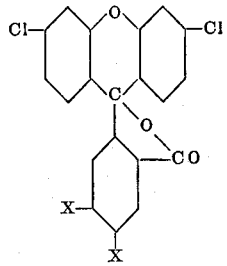

wherein one X represents the hydroxy group and the other X the carboxylic acid group, to react with a compound of the group consisting of ammonia and aliphatic, aromatic, hydroaromatic and heterocyclic primary and secondary amino compounds by melting the reagents at a temperature of between about 150° C. and about 250° C. in the presence of zinc chloride.

4. The process which comprises causing a compound of the formula:

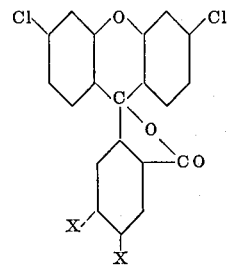

wherein one X represents the hydroxy group and the other X the carboxylic acid group, to react with an amino compound selected from the group consisting of primary and secondary amino compounds of the benzene series by melting the reagents at a temperature of between about 150° C. and about 250° C. in the presence of zinc chloride.

5. The process which comprises causing a compound of the formula:

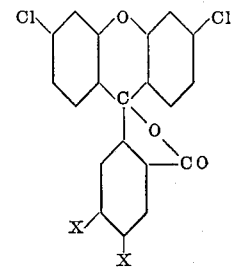

wherein one X represents the hydroxy group and the other X the carboxylic acid group, to react with an unsulfonated amino compound selected from the group consisting of primary and secondary amino compounds of the benzene series by melting the reagents at a temperature of between about 150° C. and about 250° C. in the presence of zinc chloride and sulfonating the compound thus obtained.

6. The process which comprises causing a compound of the formula:

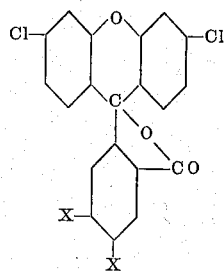

wherein one X represents the hydroxy group and the other X the carboxylic acid group, to react with 2.3-dimethyl-1-amino benzene by melting a mixture of the reagents at about 200° C. to about 210° C. for about 2½ hours in the presence of anhydrous zinc chloride and sulfonating the compound thus obtained.

7. The process which comprises causing a compound of the formula:

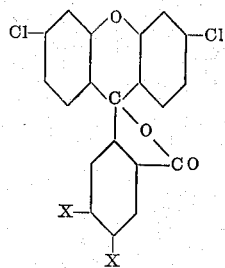

wherein one X represents the hydroxy group and the other X the carboxylic acid group, to react with aniline by melting a mixture of the reagents at about 200° C. to about 210° C. for about 1½ hours in the presence of anhydrous zinc chloride and sulfonating the compound thus obtained.

8. The process which comprises causing a compound of the formula:

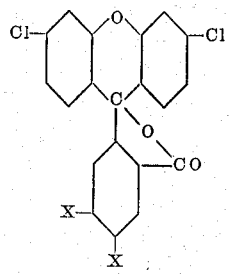

wherein one X represents the hydroxy group and the other X the carboxylic acid group, to react with 1-amino-4-methoxy-benzene by melting a mixture of the reagents at about 220° C. to about 225° C. for about two hours in the presence of anhydrous zinc chloride and sulfonating the compound thus obtained.

9. The compounds of the formula:

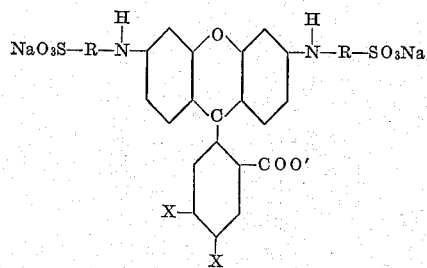

wherein the R's represent the same radical of the group consisting of aromatic, hydroaromatic and heterocyclic radicals and one X stands for the hydroxy group and the other X for the carboxylic acid group.

10. The compounds of the formula:

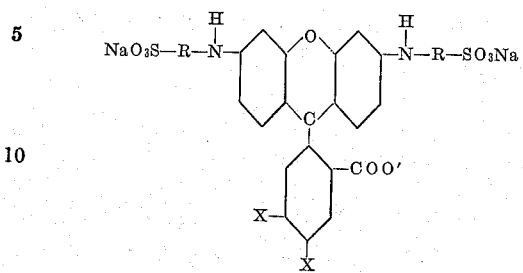

wherein the R's represent the same radical of the benzene series and one X represents the hydroxy group and the other X stands for the carboxylic acid group.

11. The compound of the formula:

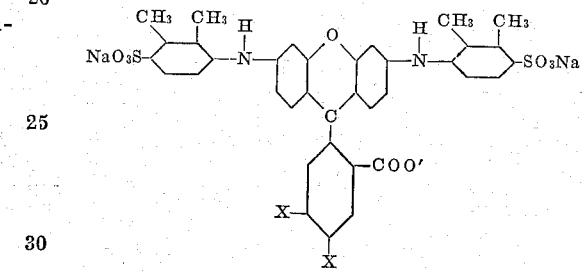

wherein one X represents the hydroxy group and the other X the carboxylic acid group, being a water-soluble dyestuff which dyes, for instance, wool from an acid bath bluish-red tints, the fastness properties of the dyeings being essentially enhanced by after-chroming.

12. The compound of the formula:

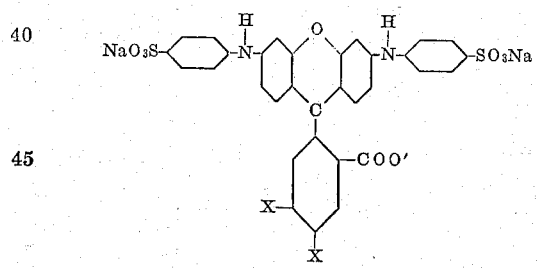

wherein one X represents the hydroxy group and the other X the carboxylic acid group, being a water-soluble dyestuff which dyes, for instance, wool from an acid bath reddish-violet tints, the fastness properties of the dyeings being essentially enhanced by after-chroming.

13. The compound of the formula:

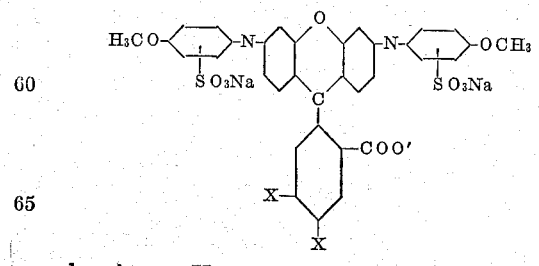

wherein one X represents the hydroxy group and the other X the carboxylic acid group, being a water-soluble dyestuff which dyes, for instance, wool from an acid bath bluish-violet tints, the fastness properties of the dyeings being essentially enhanced by after-chroming.

WILHELM ECKERT.
KARL SCHILLING.

CERTIFICATE OF CORRECTION.

Patent No. 2,296,153.   September 15, 1942.

WILLIAM ECKERT, ET AL.

It is hereby certified that error appears in the printed specification of the above numbered patent requiring correction as follows: Page 2, first column, line 40, for the word "carbon" read --carboxy--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.